United States Patent [19]
Santina

[11] Patent Number: 5,866,014
[45] Date of Patent: Feb. 2, 1999

[54] METHOD FOR REMOVING TOXIC SUBSTANCES IN WATER

[76] Inventor: Peter F. Santina, 1923 Whitecliff Way, Walnut Creek, Calif. 94596

[21] Appl. No.: 742,652

[22] Filed: Nov. 4, 1996

Related U.S. Application Data

[62] Division of Ser. No. 352,383, Dec. 8, 1994, Pat. No. 5,575,919.

[51] Int. Cl.[6] .................................................. C02F 1/52
[52] U.S. Cl. ...................... 210/716; 210/721; 210/724; 210/908; 210/909; 210/911; 210/912; 252/175; 252/178; 423/87; 423/601; 423/565
[58] Field of Search .................................. 210/715, 716, 210/717, 719, 721, 724, 726, 737, 902, 908, 909, 911, 912, 695; 423/87, 601, 602, 561.1, 565; 252/175, 178

[56] References Cited

U.S. PATENT DOCUMENTS

| | | | |
|---|---|---|---|
| 2,000,197 | 5/1935 | Smith | 210/721 |
| 4,548,718 | 10/1985 | Muir | 210/719 |
| 5,200,082 | 4/1993 | Olsen et al. | 210/667 |
| 5,308,500 | 5/1994 | Schwarzbach | 210/716 |

FOREIGN PATENT DOCUMENTS

| | | | |
|---|---|---|---|
| 3640542A1 | 6/1988 | Germany | 210/715 |

OTHER PUBLICATIONS

"Sirofloc Process", pp. 17–59 of Perry's Chemical Engineers' Handbook (Sixth Ed.).
Pp. 8–9 of American Water Works Assn "Drinking Water Research" vol. 4, No. 2 (Mar./Apr. 1994).
"Evaluating a New Granular Iron Oxide for Removing Lead from Drinking Water", T. Theis et al., pp. 101–105 of Journal AWWA (Jul. 1992).
"Miscellaneous Purification Processes" 557–558, pp. 504–505 of Public Water–Supplies (Third Ed).
"Chemistry of Arsenic Removal During Coagulation and Fe–Mn Oxidation" Marc Edwards, pp. 64–70 of Journal AWWA (Sep. 1994).
"Andco Phenol Destruct System", Andco Environmental Processes, Inc. (undated).
"Fenton's Reagent: A New Option For Hard–To–Treat Organics" Solvay Interox (undated).
"Fenton's Reagent" Solvay Interox Technical Data Sheet H7–156 (Sep. 1992).
"Fenton's Reagent" Solvay Interox Technical Data Sheet H7–214 (Sep. 1992).
"Nanoscale Metal Oxide Particles As Reagents For Destruction And Immobilization of Hazardous Substances" (Mar. 1994).
"Control of Disinfection Byproducts", U.C. Davis Engineering Dept Seminar, course 934–C200 (May 16, 1994).
"Arsenic: The Quest For Answers", Journal AWWA, vol. 86, No. 9 (Sep. 1994).

*Primary Examiner*—Peter A. Hruskoci
*Attorney, Agent, or Firm*—Thomas M. Freiburger

[57] ABSTRACT

Arsenic and TOC are removed from drinking water or wastewaters by use of finely-divided metallic iron in the presence of powdered elemental sulfur or other sulfur compounds such as manganese sulfide, followed by an oxidation step. A premix may be produced for this process, by adding the iron, sulfur and oxidizing agent to water in a predetermined pH range. The iron and sulfur are mixed for a period of time dependent upon the temperature and pH of the water and the presence of complexing or sequestering minerals and organic acids in the water. An oxidizing agent is added to the mixture and agitating is continued. In a preferred embodiment the oxidizing agent is hydrogen peroxide. Water is decanted from the mixture after a sufficient reaction time, to produce a concentrated premix. This premix can be added to water intended for drinking or to industrial effluents containing toxic materials.

9 Claims, 3 Drawing Sheets

METHOD FOR REMOVING TOXIC SUBSTANCES IN WATER

This application is a division of application Ser. No. 08/352,383, filed on Dec. 8, 1994, now U.S. Pat. No. 5,575,919.

BACKGROUND OF THE INVENTION

This invention is directed to a method and system which removes several regulated, toxic mineral and organic precursor substances from drinking water or wastewater by causing them to be adsorbed and absorbed onto sulfur-activated sponge iron particles, which may be referred to as "sulfur-modified iron". Specifically, the method and system removes from water trace amounts of (1) dissolved, colloidal, and particulate arsenic, selenium, and lead; and (2) naturally-occurring organic compounds (TOC, total organic carbon in the water), which, when oxidized, form "disinfection byproducts"; and (3) other potentially harmful minerals.

The subject matter of this invention is related to some extent to that of U.S. Pat. Nos. 4,940,549 and 5,200,082, which are directed to removal of selenium from agricultural drain water and from refinery effluents and other industrial waste waters.

The process of the present invention is particularly concerned with removal of arsenic and other toxic metals, and lowering the level of TOC from drinking water, using some of the same steps which were found efficacious in removal of selenium in the above referenced patents.

Recent scientific investigations by the United States Environmental Protection Agency (EPA) and others have suggested that arsenic in drinking water causes cancer in humans; that no quantity of arsenic in drinking water is a safe quantity; that arsenic may not be an essential human nutrient as previously reported by science; and that the cancer risk from ingesting arsenic at the currently permitted level in drinking water may equal that caused by smoking cigarettes. The EPA currently is negotiating the content of the regulations for arsenic in drinking water and it projects that the new limitation will be between 2 and 5 micrograms per liter ($\mu$g/L), most probably 2 $\mu$g/L.

Many existing water systems will have to treat to reduce the concentration of arsenic. Three examples follow:
(a) The California State Water Project which has naturally-occurring arsenic in the amount of 2 to 6 $\mu$g/L provides water for several million families;
(b) The City of Hanford, Calif. gets its drinking water for more than 20,000 people from ground water wells. Some of the wells have arsenic concentrations near the current limit of 50 $\mu$g/L;
(c) The Kern Water Bank is a project constructed to store water in underground reservoirs in times of plenty for use when water is not available. Some of the Water Bank wells have naturally-occurring arsenic. In a few, the arsenic concentration approaches 200 $\mu$g/l.

Water providers have an immediate need for an economical, safe method to remove arsenic from drinking water. Current methods, systems, and technologies have either proved to be uneconomical or ineffective to meet the proposed 2 $\mu$g/L standard. The test for economical water service is as follows: Is the cost of water less than two percent of the gross income of a family at the poverty level?

Existing technologies for removal of arsenic include the following: (a) adsorption onto activated alumina within a fixed bed contactor; (b) complexing arsenic with hydrous metallic floc, primarily aluminum and iron hydroxides or oxyhydroxides, in conventional water treatment plants; (c) sieving the metal from water by membrane technologies such as reverse osmosis; and (d) electro-dynamic processes such as electrodialysis. The present invention described below can exhibit a cost advantage of 5 to 15 times compared to these prior methods.

Also, since the middle 1970s, the EPA has warned that certain classes of byproducts formed by oxidizing naturally-occurring organic acids during disinfection are potentially carcinogenic. These compounds are regulated as "disinfection byproducts" (DBPs) to limit consumption. There are many DBP compounds of interest to EPA. Not all have been fully described or investigated with respect to their potential effects on human health or the frequency of their occurrence in domestic water systems. In addition, the epidemiclogical impact of DBPs is uncertain. Hence, there is a concerted effort of national scope to develop data on the formation of DBPs and to better define their potential impact on human health.

The EPA is currently requiring more water systems to disinfect their water to limit the occurrence of waterborne disease, while at the same time the EPA is seeking to reduce the impacts of DBPs on human health; these can be conflicting purposes. Most water systems disinfect their water. Thus, many water systems will have to initiate or modify water treatment systems to reduce DBPs to meet proposed trihalomethane limitations which may range from 40 to 60 $\mu$g/L. Other DBPs, such as haloacetic acids and several bromine compounds, will be subject to numerical concentration limits. Conventional treatment systems for surface water sources may meet many of the proposed standards if influent precursors, i.e. TOCs, can be limited to 4 mg/L prior to disinfection with chlorine.

Thus, across the United States, water providers have an immediate need for an economical, safe method to reduce the occurrence of DBPs in drinking water. Current methods, systems, and technologies have either proved to be uneconomical or ineffective to meet the proposed 40 to 60 $\mu$g/L standard. The EPA has been proposing stringent limitations on the class of DBPs known as trihalomethanes, cited above, since 1975. Water providers have often failed to meet the most basic requirement that total trihalomethanes be less than 100 $\mu$g/L.

As noted above, the primary strategy presently used to reduce DBPs is to control precursor chemicals early in the water treatment process so that smaller quantities of disinfection byproducts form during disinfection. Current alternative strategies include use of non-conventional disinfectants, treatment of the water to reduce formation of DBPs (in the presence of conventional disinfectants), and removal of DBPs after formation. Existing technologies for reducing the concentration of DBPs include the following: (a) adsorption of DBPs or precursors onto granular activated carbon within a fixed bed contactor or adsorption onto powdered activated carbon during various stages of the treatment process; (b) complexing DBPs or precursors with hydrous metallic floc, primarily aluminum and iron hydroxides, in conventional water treatment plants after adjusting the pH of influent water; (c) sieving the relatively-larger organic molecules from water by membrane technologies such as ultrafiltration; and (d) electro-dynamic processes such as electrodialysis.

It is an important object of the present invention to efficiently and very economically remove arsenic, TOCs, and other contaminant metals from drinking water. Procedures described can reduce cost of removing these contaminants by a factor of five to fifteen, particularly as compared to reverse osmosis or nanofiltration. It is a further object of the present invention to provide a method and system for removing arsenic, TOCs, and other contaminant metals which may be introduced into existing water treatment facilities. These and other objects of the invention will be apparent to those skilled in the art from the detailed description of the invention contained herein and from the accompanying drawings.

SUMMARY OF THE INVENTION

The method of the present invention removes trace amounts of certain toxic substances in drinking water, specifically: (1) dissolved, colloidal, and particulate arsenic, selenium, and lead; and (2) naturally-occurring organic compounds (Total Organic Carbon or "TOC") which, when oxidized, form disinfection byproducts; and (3) other potentially harmful minerals.

The invention utilizes a solid medium with a very high surface area finely-divided metallic elemental iron, or "sponge" iron. The medium is manufactured by forming an oxidized surface in water in the presence of finely-divided elemental sulfur or other sulfur-bearing compounds such as manganese sulfide. The solid medium, which may be called "sulfur-modified iron" and is sometimes thus referred to herein, is manufactured by mixing the constituents in water according to predetermined proportions. In one preferred embodiment of the present invention, these proportions may be approximately, by weight: 200 parts iron, 100 parts sulfur, and 1,000 parts water. The mixture is produced in water in a predetermined pH level, which for a preferred embodiment is in a: range of pH between about 5.0 and 8.5. The normal process temperatures can range from 34°. Fahrenheit to near boiling. This blend is mixed for approximately two hours while the active agent forms. Mixing time depends upon the temperature of the mixture, pH of the water, and the presence of complexing or sequestering minerals and organic acids in the water. Lower temperature, higher pH and presence of such complexing minerals generally will dictate longer mixing time. In one preferred embodiment, an oxidizing agent is added to the mixture after the pH rises and stabilizes, and agitating is continued. In a specific embodiment the oxidizing agent is hydrogen peroxide.

The solid sulfur-modified iron can be removed from the water in which it is manufactured and used to treat water. The treatment can be by batch or flow-through process. The sulfur-modified iron can be removed from the process stream by gravity separation processes, by centrifugal force, or by magnetic separation processes.

In the batch treatment process, untreated water and the components of sulfur-modified iron or pre-formed sulfur-modified iron are mixed vigorously for a variable period of time. The duration of mixing can be for as little as 5 minutes or as long as two hours depending upon the state of completeness of the sulfur-modified iron and the physical constants of the water to be treated. The mixing can be provided by airlift pumps, hydraulic mixing, action of a fluidized bed, mechanical mixers, or by other measures. Note that the batch treatment process can employ a pre-mix of sulfur-modified iron, or the iron and sulfur can be separately mixed into the untreated water. Parameters such as mix time will vary depending on which procedure is used.

In the flow-through process, the preferred process, the sulfur-modified iron is preprepared and resides in an upflow, fluidized bed reactor or other fully-mixed reactor vessel for an appropriate period of time. The sulfur-modified iron remains in the reactor by virtue of its relatively high specific gravity, 2.6±, while the untreated water flows past in turbulent mixing. Necessary resident time in the reactor is approximately 5 minutes, depending upon several process variables. Alternately, the process can take place in a pebble flocculator or contact clarifier apparatus in which the sulfur-modified iron is affixed to the surface of the treatment medium within the vessel or recirculated within the reaction zone of the process. Another alternative is to introduce the sulfur-modified iron into the center well of a rapidly mixed contact clarifier in a water or wastewater treatment plant.

It is believed that the sulfur-modified iron will become depleted in its capacity to adsorb and absorb toxic substances from water after about 100,000 pore volumes, more or less, have been treated. At that time, it may be replenished by removing the toxic substances. It may be that the sulfur-modified iron can be replenished and reused by washing it with an appropriately selected basic or acidic liquid. The choice of the replenishing fluid will be dictated by the economics of the specific installation in which it is used. The characteristics of the untreated water may permit resource recovery from the regeneration fluids. Removal, regeneration, and replacement can be a continuous flow or periodic batch process.

DESCRIPTION OR PREFERRED EMBODIMENTS

As specified above, the method of the present invention removes trace amounts of certain toxic substances or precursors to toxic substances in drinking water. This process depends upon the creation or use of a solid medium with a very high surface area produced from finely-divided metallic elemental iron called "sulfur-modified iron" herein, as explained above. The medium is generated by forming an oxidized iron surface in water in the presence of finely-divided elemental sulfur or other sulfur-bearing compounds such as manganese sulfide.

Figure 3:
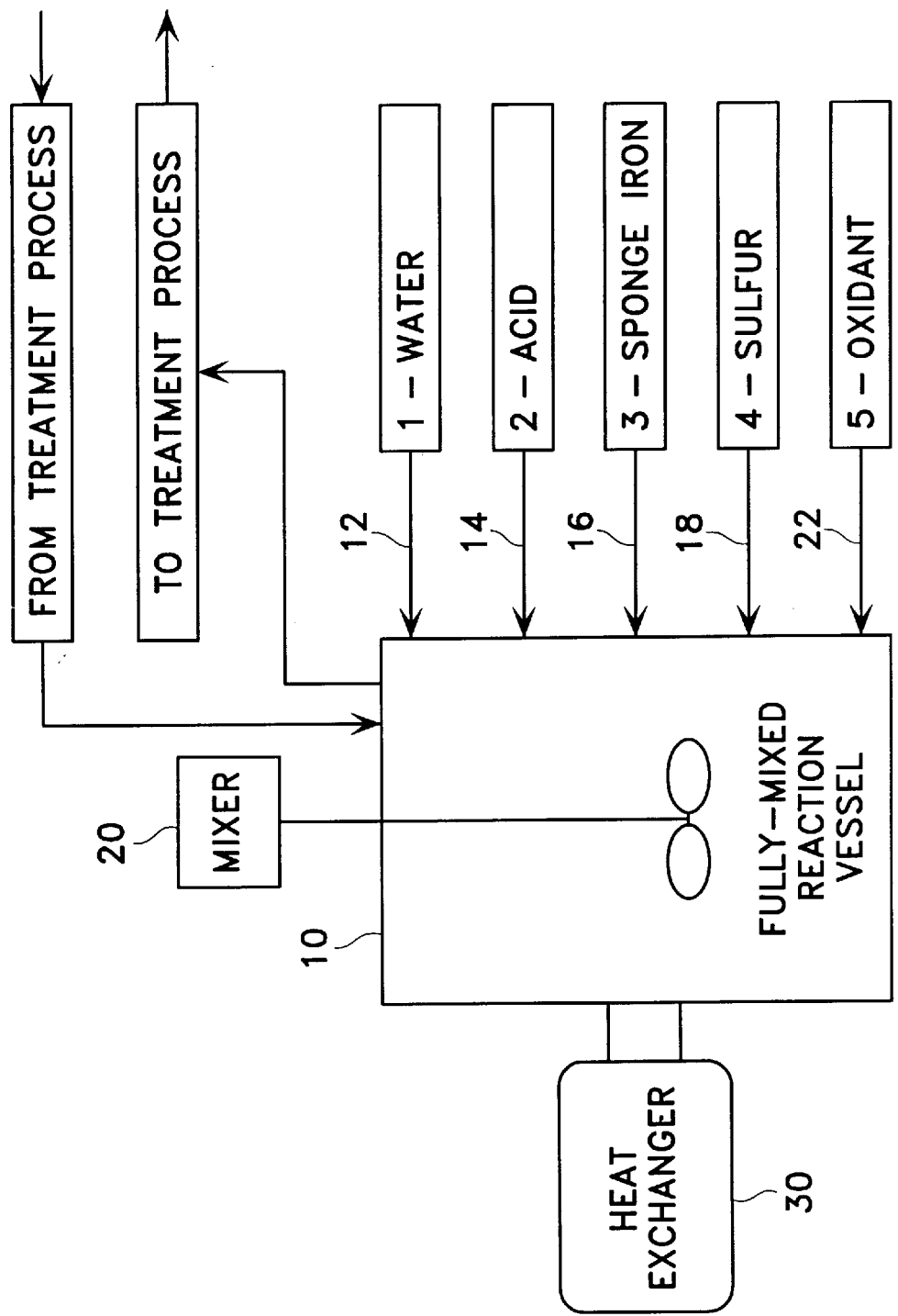
FIG. 3 is a schematic flow chart of the use of preparation of sulfur-modified iron according to the preferred batch process of manufacture of the present invention.

Accordingly, FIG. 3 illustrates a preferred method for the creation of sulfur-modified iron. A reaction vessel 10 is filled with water at 12. Next, a fluid is introduced at 14 to bring the mixture to a predetermined pH level, which for one preferred embodiment is in a range of pH between 5.0 and 8.5. In addition, heat may be introduced or recovered by heat exchanger 30 as appropriate to bring the water into an acceptable temperature range. Normal process temperatures range from 34° Fahrenheit to near boiling.

Sulfur-modified iron may be manufactured by pre-mixing the constituents in water according to predetermined proportions, as explained above. First, "sponge iron" is added at 16 and agitated by a mixer 20 for a period of time, for example one hour in one preferred embodiment. Sponge iron with particle sizes of 325 mesh or slightly larger are preferred. Next, sulfur is added at 18 and the mixture is again agitated by mixer 20, for 45 minutes in the embodiment described immediately above. In addition to elemental sulfur, it is believed that sulfur compounds such as manganese sulfide may be substituted.

In a preferred embodiment of the present invention, in preparing a pre-mix sulfur-modified iron, proportions of the reactants are approximately, by weight: 200 parts iron, 100 parts sulfur, and 1,000 parts water. This blend is mixed while the active agent forms. Mixing time depends upon the temperature of the mixture, pH of the water, and the presence of complexing or sequestering minerals and organic acids in the water, as noted above.

Next, in the preferred embodiment described, an oxidant may be added at 22, after the pH of the sulfur-iron-water suspension stabilizes. In the preferred embodiment discussed above, one part of hydrogen peroxide is introduced and the mixture is agitated by the mixer 20 for about 15 minutes.

Finally, the resulting solid sulfur-modified iron can be largely removed from the water in which it is manufactured, and can be used to treat water.

The preferred usage of sulfur-modified iron is in a flow-through process in the water treatment system as described above. In this flow-through process, the sulfur-modified iron is pre-prepared and resides in an upflow reactor or other fully-mixed reactor vessel. As described above, in this system the sulfur-modified iron is retained in the reactor by gravity while at the same time fully-mixed contact takes place as the water flows upward. The resulting mixture of toxic substances and sulfur-modified iron is separated and removed from the cleaned water by gravity, centrifugal force, or magnetic separation. The sulfur-modified iron may be recycled by regeneration, using an appropriate acidic or basic rinse solution.

Figure 2:
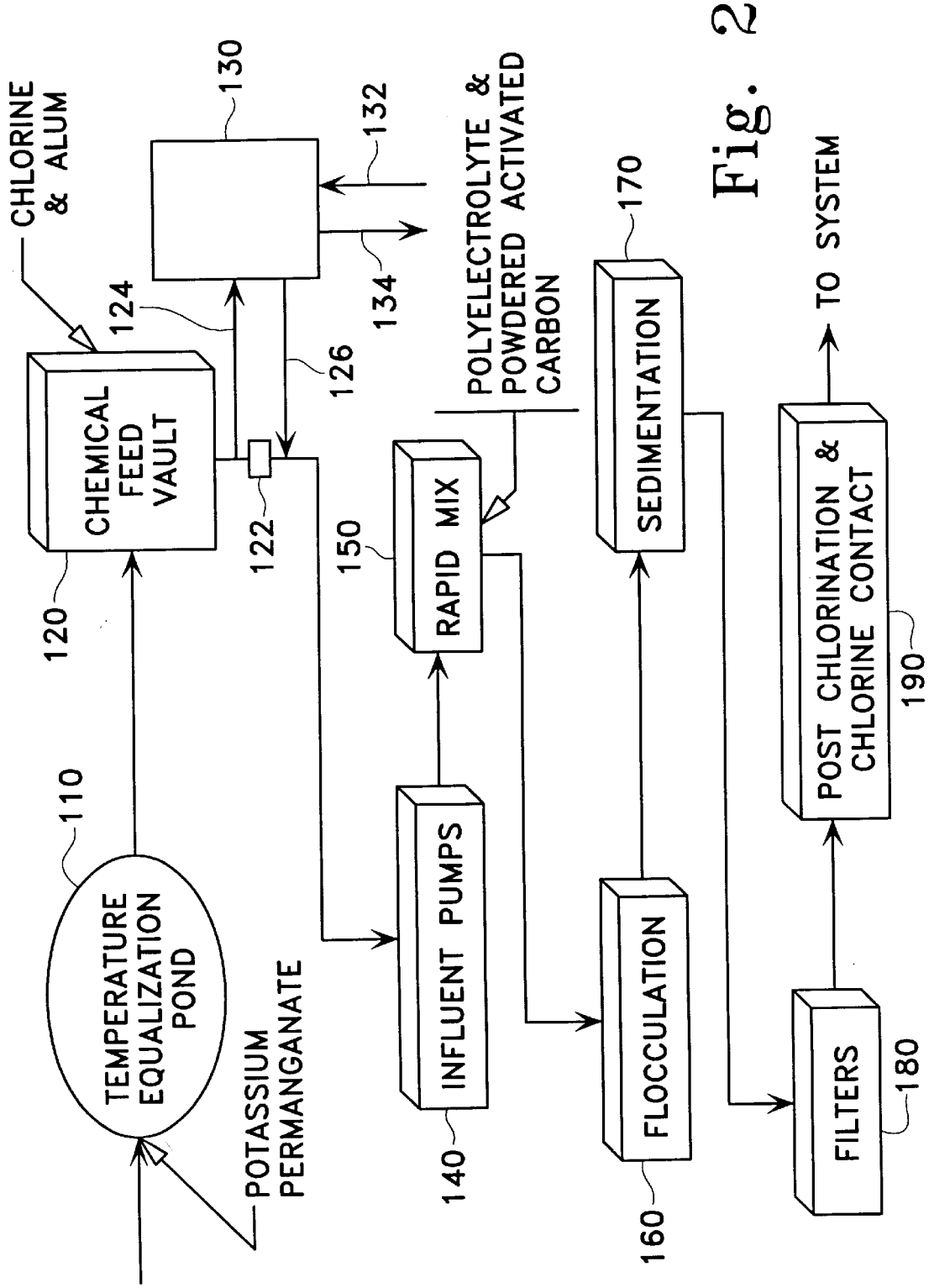
FIG. 2 is a schematic flow chart of a prior-art water treatment process/plant indicating the addition of a flow-through treatment reactor according to the present invention.

Such a reactor may be introduced into an existing water treatment plant as shown in FIG. 2. First, a valve 122 is inserted between chemical feed vault 120 and influent pumps 140. New piping 124 and 126 are introduced to convey water into and out of, respectively, the new reactor 130. Sulfur-modified iron can be introduced from infeed 132 and removed by outfeed 134.

The sulfur-modified iron will ordinarily remain in the reactor 130 by virtue of its relatively high specific gravity, 2.6±, while the untreated water flows past in turbulent mixing. Necessary residence time in the reactor 130 is approximately 5 minutes, depending upon several process variables.

Alternately, the process can take place in a pebble flocculator or contact clarifier apparatus in which the sulfur-modified iron is affixed to the surface of the treatment medium within the vessel or recirculated within the reaction zone of the process. Another alternative is to introduce the sulfur-modified iron into the center well of a rapidly mixed contact clarifier in a water or wastewater treatment plant.

The sulfur-modified iron will become depleted in its capacity to adsorb and absorb toxic substances from water after a number of pore volumes (believed to be about 100,000 pore volumes) have been treated. At that time, as discussed above, it can be replenished by removing the toxic substances. It is believed that the sulfur-modified iron can be replenished and reused by washing it with selected acidic or basic liquids, such as a caustic soda, to pull the organic compounds off the surface of the iron. The choice of the replenishing fluid will be dictated by the economics of the specific installation in which it is used. The characteristics of the untreated water may permit resource recovery from the regeneration fluids. Removal, regeneration, and replacement can be a continuous flow or periodic batch process.

Figure 1:
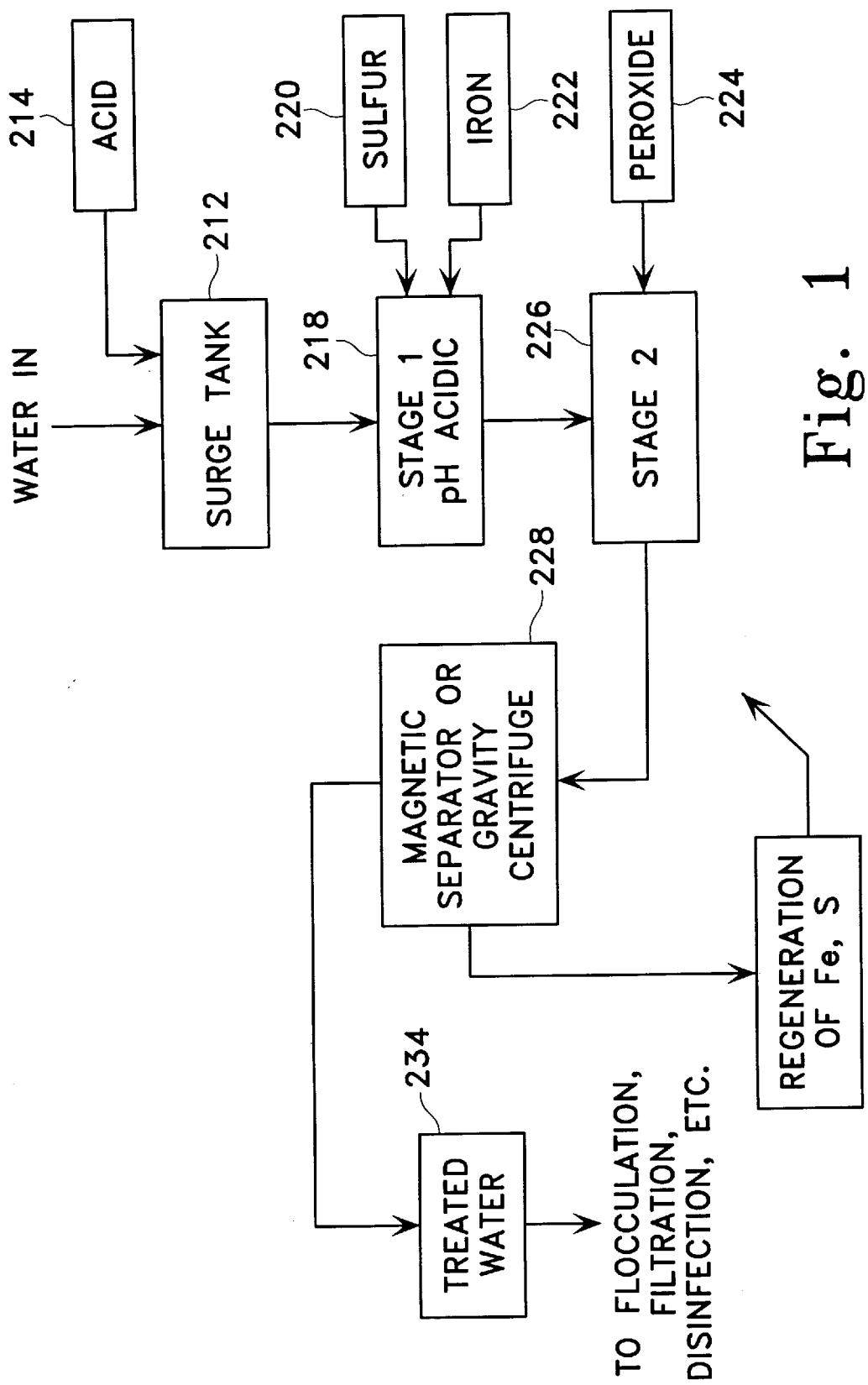
FIG. 1 illustrates a method of producing sulfur-modified iron and of treating the influent water in the same process.

An alternative method of producing sulfur-modified iron and of treating the influent water in the same process is illustrated in FIG. 1. In this batch treatment process, untreated water and either iron and sulfur or pre-formed sulfur-modified iron are mixed vigorously for a variable period of time. The duration of mixing can be for as little as 5 minutes or as long as two hours depending upon the state of completeness of the formation of the sulfur-modified iron and the physical constants of the water to be treated, including temperature and pH. The mixing can be provided by airlift pumps, mechanical mixers, or by other measures.

Water enters and is stored in a surge tank at 212, and a fluid is introduced at 214 to bring the mixture to a predetermined pH level, which for the preferred embodiment is in a range in pH between 3.5 and 8.5. An acid pH range generally causes the process to work more efficiently. However, economic considerations dictate that acidification should be avoided if practicable. Drinking water often is in a range of pH 7.5 to 9.5 (to avoid corrosion of pipes). An efficient range of pH is 5.0 to 8.5, but slightly higher pH can be acceptable, depending on content of the water. In addition, heat may be introduced as appropriate to bring the water into an acceptable range. The normal process temperatures range from 34° F. to near boiling, but temperatures above room temperature tend to produce faster reaction time. Of course, it is more economical not to heat the water if this can be avoided within practical time constraints.

Next, at first stage 218, sponge iron at 222 is added and agitated by a mixer. Either sponge iron or partially prepared sulfur-modified iron may be used. Next, if iron alone has been added, sulfur is added at 220 and the mixture is again agitated for an additional period of time. As mentioned above, it is believed that sulfur compounds such as manganese sulfide may be substituted.

Next, an oxidant at 224 is added at to the mixture at the second stage 226, after the pH of the sulfur-iron-water suspension stabilizes. Again, in the preferred embodiment discussed above, one part of hydrogen peroxide is introduced (relative to 200 parts iron and 100 parts sulfur by weight) and the mixture is agitated.

Finally, the reacted solid sulfur-modified iron can be removed from the water by magnetic separation, gravity or centrifuge, as indicated at 228. The treated water 234 may then be subjected to further treatment as conventional.

In addition to the form described above, the sulfur-modified iron may be affixed to a substrate solid material such as silica, alumina, ceramic, or other materials. This approach has the disadvantage that the use of the substrate diminishes the effectiveness of the sulfur-modified iron by diminishing its surface area, and the advantage of being easier to suspend in the water than particulate iron. Another potential advantage is in allowing a combination with other catalysts. There are application techniques wherein the less-mobile substrate (less easily suspended) is more practical and desirable, such as in a point-of-use water filter.

Water treatment science has examined many of the reactions associated with removal of toxic substances from water including (a) chemical and biological oxidation and reduction phenomenon; (b) formation of metallic and non-metallic hydroxides or oxyhydroxides in conventional water treatment processes; (c) chemical precipitation processes; (d) molecular sieve process such as reverse osmosis and ultra-filtration; and (e) electromotive-force process such as electrodialysis. The family of sulfur-modified iron processes developed according to the invention and described herein has not been described at the atomic level by water treatment researchers, nor have the process performance characteristics been defined independently of the work performed pursuant to this invention. Perhaps the closest related processes are the Fenton-Reagent Process and the ferric sulfide coagulation processes which do not use solid, particulate chemicals, but use liquid.

Recent experiments in corrosion science have produced photographs with atomic-level resolution of the formation of rust on iron particles in water. This work, reported by Roger C. Newman in "Science", vol.263, 1708 & 1709, states "the passive oxide film on iron is none of the known hydroxides or oxyhydroxides". He further reports that "the iron in the film is surrounded by six oxygen atoms in a distorted octahedral arrangement, and that these octahedra share edges and faces, perhaps forming sheets or chains". It is believed, according to this invention, that the oxide film that forms on the porous, elemental iron in the presence of sulfur causes one or more of the oxygen atoms to be replaced with sulfur, causing the formation of the unique surface-active treatment agent: sulfur-modified iron. The use of this solid, particulate material rather than liquid reagents provides for more economical and effective contaminant removal than processes used previously.

By the processes described herein, treatment with sulfur-modified iron has removed precursors of DBPs, analyzed as Total Organic Carbon, from natural water sources to a concentration of 4 mg/L or less. Total Organic Carbon concentration in the untreated water of test samples varied from 6 to 20 mg/L. In the case of paper mill acid ditch effluent, COD was reduced from 3080 to 2100 with only 15 minutes reaction time.

Sulfur-modified iron also has consistently removed arsenic from natural water sources to less than 5 $\mu$g/L (the practical quantitative limit of test equipment used for analyses.) Arsenic concentration in the untreated water varied from 34 to 170 $\mu$g/L.

Several examples of the results of the procedure on arsenic removal are presented in Examples 1 through 4, 6 and 10 below. Examples demonstrating the results of the procedure on TOC removal are presented in Examples 5 through 9 and 11 below.

In the examples reported below, the quantity of particulate iron employed, as compared to the amount by weight of arsenic contaminating the water, often is in a ratio of about 1000:1, sometimes less, sometimes greater. The amounts of powdered iron ranged in most cases from about 0.15 gram to 0.5 gram. However, it is believed that the amount of iron could be reduced down to about 0.01 g/L, or even 0.005 g/L, for effective removal of most of the contaminating arsenic in the sample quantities disclosed. The amount of sulfur is generally maintained at about one-half by weight the amount of iron, which it is believed will hold true with the smaller quantities of iron projected above.

The examples set forth below have all employed granular, powdered iron or "sponge iron", and from the experience of testing it is believed that an effective range of iron particle sizes about −20 to about −400 mesh. However, iron in any particle size will have some efficacy, in combination with the steps and other reagents described, in removing arsenic, TOC and AOX from water. One procedure for removing these contaminants, not described in the examples below, is to form a bed of sulfur-modified iron particles, but with a larger particle size, up to about ¼ inch. This bed, arranged in the manner of a granular filter bed or contact bed, provides a stable medium through which the contaminated water is directed, by gravity or pumping. This arrangement can serve efficiently in a water treatment system.

EXAMPLE 1—ARSENIC IN WELL WATER

A sample was obtained from the Kern County Water Agency as a part of the normal sampling run of the wells in the Kern Water Bank. The well is owned by the California Department of Water Resources. This well, designated 32N2, has naturally-occurring arsenic. The sample was stored at approximately 34° F. In the water sampled during this run, the arsenic concentration was 170 $\mu$g/L. Other than the elevated concentration of arsenic, this well water is typical of well water used throughout the California Central Valley for domestic water service.

This sample was treated for removal of arsenic by batch treatment by the method and system of this invention. Starting temperature of the 1,000 mL sample was 60° F. and pH was 8.8. The sample was acidified to pH 4.3 with 3 mL, 1N sulfuric acid. To the acidified water sample was added 0.3 grams of finely-divided sponge iron and 0.1 gram of finely divided elemental sulfur (no pre-mix of sulfur-modified iron was prepared). The previously-clear mixture turned cloudy. After approximately 1 hour and 20 minutes, one drop of hydrogen peroxide was added to the mixture; pH was 6.1 before the $H_2O_2$ and 5.5 after. The mixture was stirred rapidly for total time of 1 hour and 53 minutes after adding the iron at which time a sample of the decanted mixture was sent to a certified water quality laboratory for analysis for arsenic. Arsenic concentration reported was less than the practical quantition limit of 5 $\mu$g/L.

EXAMPLE 1—28 MAR. 1994

| TIME (min) | ACTIVITY | pH | TEMP °F. | LAB NOTES | As ($\mu$g/L) |
|---|---|---|---|---|---|
| −30 | Refrigerated Kern Water Bank well water in unopened 1 L sample bottle. Well 32N2 | 8.8 | 34 | Clear, stirring slowly | 170 |
| −15 | Add 3 mL 1N $H_2SO_4$ | 4.3 | 60 | Clear, stirring slowly | |
| −10 | Add 0.3 g Fe, Grade B | 4.1 | | Clear, stirring slowly | |
| 0 | Add 0.1 g S, dry, powdered | | | Cloudy, stirring slowly | |
| 0 | Increase stirring to rapid | | | Cloudy, rapid | |
| +20 | | 6.1 | | Cloudy, rapid | |
| +20 | Add 1 drop 3% $H_2O_2$ | 5.5 | | Cloudy, rapid | |
| +112 | Decant and sample. Laboratory filter. | 6.4 | | Cloudy (before filtration) | ND |

ND = Not detected. Practical Quantitation Umit = 5 $\mu$g/L.

EXAMPLE 2—ARSENIC IN WELL WATER

Example 2 uses the same sample water source and treatment dynamics as Example 1 and is a confirmation of the methods of Example 1. The reagent quantities and procedures varied slightly.

EXAMPLE 2–4 APR. 1994

| TIME (min) | ACTIVITY | pH | TEMP °F. | LAB NOTES | As ($\mu$g/L) |
|---|---|---|---|---|---|
| −30 | Refrigerated Kern Water Bank well water in unopened 1 L sample bottle. Well 32N2 | 9.3 | 34 | Clear, stirring rapidly | 170 |

EXAMPLE 3—ARSENIC IN WELL WATER

Example 3 uses the same sample water source and treatment dynamics as Examples 1 and 2. It is a confirmation of the methods of Examples 1 and 2, with slightly different reagent quantities and procedures, including acid and iron quantities. Note that initial pH in Examples 1–3 is 8.8 to 9.3, with essentially complete arsenic removal.

EXAMPLE 3—17 APR. 1994

| TIME (min) | ACTIVITY | pH | TEMP °F. | LAB NOTES | As (µg/L) |
|---|---|---|---|---|---|
| −30 | Refrigerated Kern Water Bank well water in unopened 1 L sample bottle. Well 32N2 | 9.0 | 34 | Clear, stirring rapidly | 170 |
| −10 | Add 1.5 mL 1N $H_2SO_4$ | 6.4 | 60 | Clear, stirring rapidly | |
| 0 | Add 0.15 g Fe, MH-100 | 6.0 | | Clear, stirring rapidly | |
| 0 | Add 0.1 g S, dry, powdered | 6.0 | | Cloudy, stirring slowly | |
| +25 | | 6.1 | | Cloudy, rapid | |
| +15 | Add 1 drop 3% $H_2O_2$ | 5.7 | | Cloudy, rapid | |
| +170 | Decant, filter, & sample. | 7.8 | | Cloudy | ND |

EXAMPLE 4—ARSENIC IN WELL WATER

Example 4 uses the same sample water source and treatment dynamics as Examples 1, 2, and 3, except that sulfur is not added (except as present in sulfuric acid). It is a confirmation of the methods of the previous examples, but indicating that arsenic removal is not as complete without addition of sulfur.

| TIME (min) | ACTIVITY | pH | TEMP °F. | LAB NOTES | As (µg/L) |
|---|---|---|---|---|---|
| −30 | Refrigerated Kern Water Bank well water in unopened 1 L sample bottle. Well 32N2 | 9.4 | 34 | Clear, stirring rapidly (until decant) | 170 |
| −10 | Add 3 mL 1N $H_2SO_4$ | 3.5 | 60 | | |
| 0 | Add 0.2 g Fe, MH-100 | 3.0 | | | |
| +15 | Add 1 drop 3% $H_2O_2$ | 3.5 | | | |
| +185 | Decant, filter, & sample | 5.3 | | | 6 |

EXAMPLE 5—TOC IN SURFACE WATER

A water sample, 2½ gallons, was taken from Rock Slough Bridge (Br.#RSB5/28), Contra Costa County, Calif. at the same point that Contra Costa County Water District (California) samples its source water for its water treatment plant. The sampling time was coordinated with the District sample run. The purpose of this test and sample is to demonstrate removal of total organic carbon from surface water.

The treatment is essentially the same as described in Example 1. The major difference is that the treated water was rich in natural organic chemicals which tend to bind the iron and reduce its treatment effectiveness. It should be kept in mind that the TOC content in samples will decrease somewhat with time following taking of the sample, without any treatment, because some of the content of TOC is volatile.

EXAMPLE 5—28 APR. 1994

| TIME (min) | ACTIVITY | pH | TEMP °F. | LAB NOTES | TOC mg/L |
|---|---|---|---|---|---|
| −30 | 800 mL refrigerated Rock Slough water blended with 200 mL Kern Water Bank well water | 8.1 | 34 | Blend, stirring rapidly | 5 |
| −10 | Add 2.5 mL 1N $H_2SO_4$ | 5.5 | 60 | Blend, stirring rapidly | |
| −5 | Add 0.2 g Fe, Grade B | 5.5 | | Blend, stirring rapidly | |
| 0 | Add 0.1 g S, dry, powdered | 5.5 | | | |
| +15 | | 5.9 | | | |
| +15 | Add 2 drops 3% $H_2O_2$ | 5.6 | | Continued rapid stirring | |
| +50 | 30 mL sample filtered with Whatman 42 | | | | 4 |

EXAMPLE 6—TOC & ARSENIC IN SURFACE WATER

This example used the same sample as Example 5, but "spiked" with arsenic by mixing 800 mL of surface water with 200 mL of the water from the Kern Water Bank well 32N2, described in Example 1.

EXAMPLE 6—29 APR. 1994

| TIME (min) | ACTIVITY | pH | TEMP °F. | LAB NOTES | TOC mg/L | As µg/L |
|---|---|---|---|---|---|---|
| −20 | 800 mL refrigerated Rock Slough water blended with 200 mL Kern Water Bank well water | 8.2 | 34 | Blend, rapid stirring | 7.0 | 34 |
| −5 | Add 2 mL 1N $H_2SO_4$ | 4.8 | | | | |
| −0 | Add 0.2 g Fe, Grade B | | | | | |
| 0 | Add 0.1 g S, dry, powdered | 4.6 | | | | |
| +18 | | 5.5 | | | | |
| +18 | Add 3 drops 3% $H_2O_2$ | 5.0 | | | | |
| +80 | 100 mL sample filtered with Whatman 42 | | | Continued rapid stirring until filtration | 5.0 | |
| +80 | 50 mL sample, unfiltered | | | | | 2.6 |

EXAMPLE 7—TOC IN SURFACE WATER

The same Rock Slough surface water, a source of drinking water before treatment, was treated alone, without addition of arsenic-containing water. Tests were conducted using the method of the invention, in order to reduce the concentration of TOC in the water.

EXAMPLE 7—7 MAY 1994

| TIME (min) | ACTIVITY | pH | TEMP °F. | LAB NOTES | TOC mg/L |
|---|---|---|---|---|---|
| −20 | 1,000 mL refrigerated Rock Slough water | 8.1 | 34 | Clear | 7.0 |
| −5 | Add 2 mL 1N $H_2SO_4$ | 4.8 | | | |
| 0 | Add 0.2 g Fe, Grade B | | | | |
| 0 | Add 0.1 g S, dry, powdered | 4.6 | | | |
| +18 | | 5.5 | | | |
| +18 | Add 3 drops 3% $H_2O_2$ | 5.0 | | | |
| +80 | 100 mL sample filtered with Whatman 42 | | | Continued rapid stirring until filtration | 5.0 |
| +80 | 50 mL sample, unfiltered | | | | |

EXAMPLE 8—TOC IN SURFACE WATER

The surface water sample was taken from the same point on Rock Slough as the previous examples three hours before this test. A shorter test period was used to develop data on the maturation of the active agent. This experiment was conducted to determine the influence of pH adjustment on the effectiveness of the active agent. The process appeared to remain effective at a higher pH, all other variables remaining the same, except the oxidizing agent, which was sodium hypochlorite in this test. This test also shows that the process works in the presence of alum, which is often used in municipal treatment plants.

EXAMPLE 8—10 MAY 1994

| TIME (min) | ACTIVITY | pH | TEMP °F. | LAB NOTES | TOC mg/L |
|---|---|---|---|---|---|
| −180 | 1,000 mL Rock Slough water | 8.2 | | | 4.0 |
| 0 | Add 0.2 g Fe, Grade B | | | Rapid stirring | |
| 0 | Add 0.1 g S, dry, powdered | 7.6 | | Rapid stirring | |
| +10 | Add 9 drops 5.35% sodium hypochlorite solution | 8.1 | | Rapid stirring | |
| +15 | Add 3 drops 50% aluminum sulfate solution | 8.3 | | Slow stirring | |
| +18 | | 7.3 | | Slow stirring | |
| +30 | 100 mL sample, filtered with Whatman 934-AH | 7.1 | | | 3.0 |

EXAMPLE 9—TOC IN SURFACE WATER

The surface water sample was taken from the same point on Rock Slough as the previous examples one hour and 40 minutes before this test. This sample was taken to investigate the performance of the active agent during severe deteriorations in water quality.

EXAMPLE 9—1 JUN. 1994

| TIME (min) | ACTIVITY | pH | TEMP °F. | LAB NOTES | TOC mg/L |
|---|---|---|---|---|---|
| −115 | 1,000 mL Rock Slough water | 3.8 | | | 12 |
| −5 | Add 5 mL 1N $H_2SO_4$ | 3.4 | 60 | Rapid stirring | |
| 0 | Add 0.3 g Fe, Grade B | | 60 | Rapid stirring | |
| 0 | Add 0.2 g S, dry, powdered | | 60 | Rapid stirring | |
| +25 | Add 4 drops 3% $H_2O_2$ | 6.1 | 60 | Rapid stirring | |
| +135 | 100 mL sample filtered with Whatman 934-AH | 6.2 | 60 | No stirring | 6.0 |
| +175 | 100 mL sample, filtered with Whatman 934-AH | 7.3 | | Clear supernate. Gas evolving from sludge. | 5.0 |

EXAMPLE 10—ARSENIC IN WELL WATER, TREATED WITH SULFUR-MODIFIED IRON PRE-MIX

In this example, a pre-mix was prepared of reagents in distilled water, prior to introduction into the well water to be treated for arsenic. This shows that reaction can be achieved in the pre-mix, sufficient to form a reactive, concentrated reagent mix for addition directly to the water to be treated, without need for direct application of the individual non-reacted reagents (iron, sulfur, oxidizing agent) to the well water. The advantage is that a much smaller reaction vessel and much less mixing energy is used to achieve treatment as compared with not using premix.

To one liter of distilled water, powdered iron (sponge iron), elemental sulfur and a 3% hydrogen peroxide solution were added. The quantities were as follows: Grade B iron, 0.5 g; elemental sulfur, 0.2 g; hydrogen peroxide, 0.5 mL. No acid was included. These reagents were stirred in the one liter of water for one hour. After stirring, 980 mL of water were decanted off the settled mixture, leaving 20 mL of concentrated reagent mix, i.e., sulfur-modified iron. The concentrated reagent was then added to one liter of Kern County well water having an arsenic content of 40 $\mu$g/L. The procedure is shown in the following table:

EXAMPLE 10—10 SEP. 1994

| TIME (min) | ACTIVITY | pH | TEMP °F. | LAB NOTES | As $\mu$g/L |
|---|---|---|---|---|---|
| | 1 L Kern County well water, 15C1 | 7.3 | 60 | | 40 |
| 0 | Add 20 mL sulfur-modified iron pre-mix | | 60 | Rapid stirring (continuous) | |
| +10 | | | | 50% removal | 20 |
| +20 | | | | 60% removal residue brown (continuous) | 16 |

This example shows that an effective mix can be prepared and will accomplish the removal of arsenic from drinking water in substantially the same manner as with the above examples which involved separate addition of each of the individual reagents. The example also demonstrates that a great deal of arsenic removal is accomplished, using the pre-mix as above, in a very early phase of the process. Over 50% removal was effected in the first ten minutes; 60% in the first twenty minutes. It is projected that removal would be complete to the point of less than 5 $\mu$g remaining, if the reaction were taken to approximately 45 minutes. Also, it is believed the reaction would be accelerated if the peroxide were added to the entire batch of well water, at a time subsequent to the addition of iron and sulfur. It is also believed that the process could be accelerated if acid were added to reduce the pH to an acid range.

EXAMPLE 11—REMOVAL OF TOC (AOX) FROM PAPER MILL ACID DITCH LIQUOR

In this test, procedures similar to the above were applied to effluent "acid ditch" liquor of a James River Corporation paper mill. Example 11 involved preparation of a premix of iron, sulfur and peroxide in distilled water, with the premix then being introduced to the acid ditch sample. The premix was prepared using a laboratory chemical mixer. Table 11 below reports the results of Example 11, with various components of the acid ditch liquor quantified both before and after treatment by the process of Example 11.

EXAMPLE 11—31 JUL. 1994

| TIME (min) | ACTIVITY | pH | TEMP °F. | LAB NOTES | COD mg/L | AOX mg/L |
|---|---|---|---|---|---|---|
| −90 | 1,000 mL distilled water, for premix | 7.0 | 60 | | | |
| −85 | Add 0.4 g Fe, Grade B | | 60 | Rapid stirring | | |
| −85 | Add 0.2 g S, powdered | | | Rapid stirring | | |
| −70 | Add 6 drops 3% $H_2O_2$ | | 60 | Rapid stirring | | |
| −15 | Decant off 950 mL $H_2O$, leaving 50 mL premix | | 60 | | | |
| 0 | 1 L James River liquor. Add premix of sulfur-modified iron | | 60 | Rapid stirring | 3080 | 80.0 |
| +15 | 100 mL sample, filtered with Whatman 934-AH | | 60 | | 2100 | 58.9 |

TABLE 11

| Analyte | Acid Ditch - Untreated | Acid Ditch - Treated |
|---|---|---|
| $BOD_5$ (ppm) | 561 | 403 |
| COD (ppm) | 3080 | 2100 |
| pH | 6.1 | 5.1 |
| TSS (ppm) | 403 | 25 |
| Color (NCASI color, units) | 3170 | 4240 |
| Chlorinated Phenolics (ppb): | | |
| 2,4,5 Trichlorophenol | ND(2.5) | ND |
| 2,3,6 Trichlorophenol | 69 | 57 |
| 2,3,4,6 Tetrachlorophenol | ND(2.5) | ND |
| Pentachlorophenol | ND(5) | ND |
| 3,4,5 Trichloroguaiacol | 24 | ND |
| 3,4,6 Trichloroguaiacol | 7.3 | ND |
| 4,5,6 Trichloroguaiacol | 18 | ND |
| Tetrachloroguaiacol | 8.8 | ND |
| 3,4,5 Trichlorocatechol | 110 | 88 |
| 3,4,6 Trichlorocatechol | ND(5) | ND |
| Tetrachlorocatechol | 15 | ND |
| Trichlorosyringol | ND(2.5) | ND |
| AOX (ppb) | 80,000 | 58,900 |

As noted, the results reported in table 11 were taken from sample JR2.2, after only 15 minutes of reaction time of the sulfur modified iron premix with the James River acid ditch liquor sample. Table 11 shows dramatic results for this short reaction time. COD alone was reduced from 3080 mg per liter to 2100 mg per liter. AOX (purgeable organic halides), was reduced from 80,000 to 58,900 $\mu$/L. The trend of the above examples, and additional experience with the method of the invention, have indicated that improved results will be obtained if the oxidizing agent, e.g. hydrogen peroxide, is added later in the reaction, i.e. not as part of the prepared premix but after a certain reaction time of the iron and sulfur with the liquor.

The disclosed method and system remove a range of toxic substances economically and effectively in either large, municipal-sized drinking water treatment plants or smaller single-home or industrial units. The method and system can be applied as a stand-alone treatment or in conjunction with other processes. The original source of the untreated domestic water or wastewater can be ground water, surface water or certain industrial effluents.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for producing a sulfur-modified iron premix for use in treating water to remove contaminants, comprising:
   adding water to a container,
   establishing the pH of the water to a pH range of about 5.0 to 8.5, including adjusting the pH of the water if necessary,
   adding elemental iron to the water,
   adding sulfur to the water,
   agitating the water to maintain the iron and sulfur dispersed in the water as a slurry, and removing water from the slurry to form a reactive, concentrated reagent mix capable of removing contaminants when added directly to water to be treated.

2. The method of claim 1, wherein the iron has a particle size at least as small as about 80%–325 mesh.

3. The method of claim 1, further including, following the step of agitating, and after a period of time within which the pH of the slurry rises and then stabilizes, adding an oxidizing agent to the slurry.

4. The method of claim 3, wherein the step of adding an the oxidizing agent comprises adding hydrogen peroxide solution to the slurry.

5. A method for removing contaminants from water subject to eventual human consumption, using a sulfur-modified iron premix formed as in claim 1, comprising:
   adding the concentrated sulfur-modified iron premix as formed by the steps of claim 1 to the water subject to eventual human consumption,
   agitating the water to maintain the sulfur-modified iron premix dispersed in the water, for a period of time sufficient to effect recovery of a precipitate with contaminants attached to the sulfur-modified iron, and
   separating the recovered precipitate to produce a treated water.

6. The method of claim 5, wherein the contaminants in the water subject to eventual human consumption include arsenic.

7. The method of claim 5, wherein the contaminants in the water subject to eventual human consumption include TOC.

8. A method for removing contaminants from water subject to eventual human consumption, using a sulfur-modified iron premix formed as in claim 1, comprising:

adding the concentrated sulfur-modified iron premix as formed by the steps of claim 1 to the water subject to eventual human consumption, agitating the water to maintain the sulfur-modified iron premix dispersed in the water, the amount of the sulfur-modified iron premix being selected to permit recovery of one or more contaminants with additional steps of:

continuing to agitate the water, after a period of time within which the pH of the water rises and then generally stabilizes, oxidizing the water sufficiently to effect contaminant recovery as a precipitate with the contaminant attached to the sulfur-modified iron, and continuing to agitate the water substantially continuously, and separating the recovered precipitate to produce a treated water.

9. The method of claim 8, wherein the quantity of the concentrated sulfur-modified iron premix used in water subject to eventual human consumption is such that the amount of iron is more than 100:1 by weight as compared to the contaminant content of the water.

\* \* \* \* \*